United States Patent
Lee (10) Patent No.: US 8,687,083 B2
(45) Date of Patent: Apr. 1, 2014

(54) HIGH RESOLUTION DIGITAL IMAGE CAPTURING APPARATUS AND REFERENCE PIXEL MEMORY STORAGE SPACE CONFIGURATION METHOD

(75) Inventor: Te-Wei Lee, Jhubei (TW)

(73) Assignee: Alpha Imaging Technology, Corp., Jhubei (TW)

( * ) Notice: Subject to any disclaimer, the term of this patent is extended or adjusted under 35 U.S.C. 154(b) by 539 days.

(21) Appl. No.: 13/108,116

(22) Filed: May 16, 2011

(65) Prior Publication Data

US 2012/0044383 A1 Feb. 23, 2012

(30) Foreign Application Priority Data

Aug. 18, 2010 (TW) ................................ 99127563 A (51) Int. Cl.
*H04N 5/228* (2006.01)
(52) U.S. Cl.
USPC ..................................................... 348/222.1
(58) Field of Classification Search
CPC .... H04N 3/1562; H04N 5/77; H04N 5/23229
USPC ..................................................... 348/222.1
See application file for complete search history.

(56) References Cited

U.S. PATENT DOCUMENTS 5,661,525 A * 8/1997 Kovacevic et al. ............ 348/452
7,853,044 B2 12/2010 Ruggiero
2002/0009144 A1 * 1/2002 Ishihara et al. ........... 375/240.16
2005/0276323 A1 * 12/2005 Martemyanov et al. . 375/240.03
2007/0041648 A1 2/2007 Kadono et al.
2007/0071103 A1 * 3/2007 Bi et al. .................... 375/240.18

FOREIGN PATENT DOCUMENTS

TW 200412152 A 7/2004
TW 200718209 A 5/2007

* cited by examiner

*Primary Examiner* — James Hannett (74) *Attorney, Agent, or Firm* — Birch, Stewart, Kolasch & Birch, LLP (57) ABSTRACT

A reference pixel memory storage space configuration method for configuring a main storage sub-space and an extra storage sub-space of a reference pixel memory storage space of a high resolution digital image capturing apparatus is disclosed. The method includes steps of: calculating a first frame to obtain a plurality of first reconstruction reference pixels; storing the first reconstruction reference pixels in the main storage sub-space; moving a search range window to search the first reconstruction reference pixels and calculating a second frame by referencing the first reconstruction reference pixels covered by the search range window to obtain a plurality of second reconstruction reference pixels, and when the search range window is moved from a first region to a second region in the main storage sub-space, the first region becomes an available space. The second reconstruction reference pixels are orderly stored in the extra storage sub-space and the available space.

19 Claims, 5 Drawing Sheets

HIGH RESOLUTION DIGITAL IMAGE CAPTURING APPARATUS AND REFERENCE PIXEL MEMORY STORAGE SPACE CONFIGURATION METHOD

BACKGROUND OF THE INVENTION

1. Field of the Invention

The invention relates to high resolution digital image capturing, in particular, to a high resolution digital image capturing apparatus and a reference pixel memory storage space configuration method applied in the high resolution digital image capturing apparatus.

2. Description of the Prior Art

With the development of the technology, various kinds of image capturing apparatuses with different functions, for example, a mobile camera, a webcam, and a computer camera, have been widely applied in our daily life. In recent years, because ordinary consumers have more and more demands for image resolution, image capturing apparatuses with high resolution digital image capturing function have been developed to meet the requirements of the consumers.

In general, these high resolution digital image capturing apparatuses use the digital video coder/decoder standard with high compression ratio, for example, H.264/MPEG-4 AVC, to perform video coding/decoding to provide the digital image with high resolution. However, for these digital video coder/decoder standards with high compression ratio, it is important to properly and efficiently configure the memory space of the high resolution digital image capturing apparatus. Especially, for some video compression methods determining the digital video compression efficiency by referencing other reference frames, for example, an inter-prediction method, how to properly and efficiently configure the memory space is a problem needed to be solved.

Figure 1:
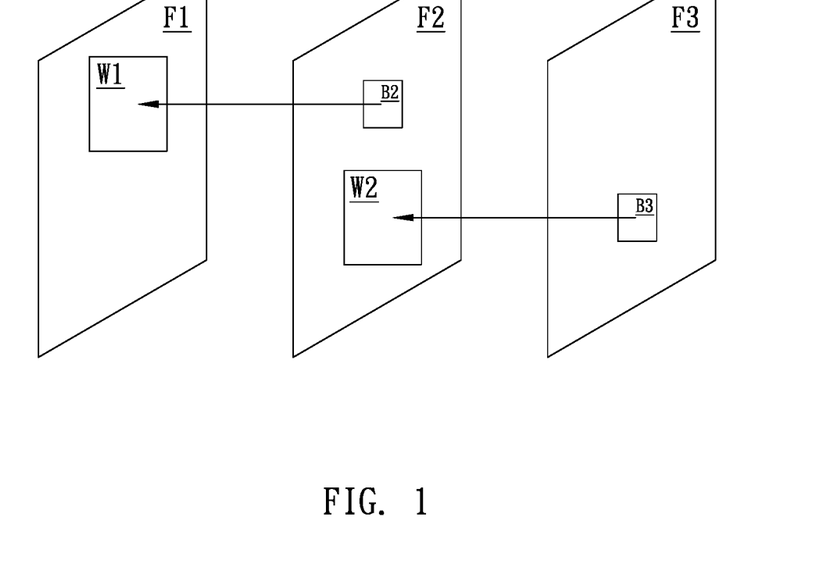
FIG. 1 illustrates a schematic diagram of the inter-prediction method.

Taking the inter-prediction method for example, the inter-prediction method references several frames previous to a current frame to calculate the current frame, and the high resolution digital image capturing apparatus usually stores all possibly referenced frames in a reference pixel memory space. The reference pixel memory space storing the referenced frames will not be released until the calculation of the current frame is finished. Please refer to FIG. 1. FIG. 1 illustrates a schematic diagram of an embodiment of performing the inter-prediction method.

As shown in FIG. 1, when a current search macro block B2 in a second frame F2 is calculated, pixels in a search range window W1 in a first frame F1 previous to the second frame F2 will be used as referenced pixels. In the same way, when a current search macro block B3 in a third frame F3 is calculated, pixels in a search range window W2 in the second frame F2 previous to the third frame F3 will be used as referenced pixels. Therefore, the reference pixel memory space of the high resolution digital image capturing apparatus should be large enough to store at least two reference frames to meet the requirement of the inter-prediction method.

Figure 2:
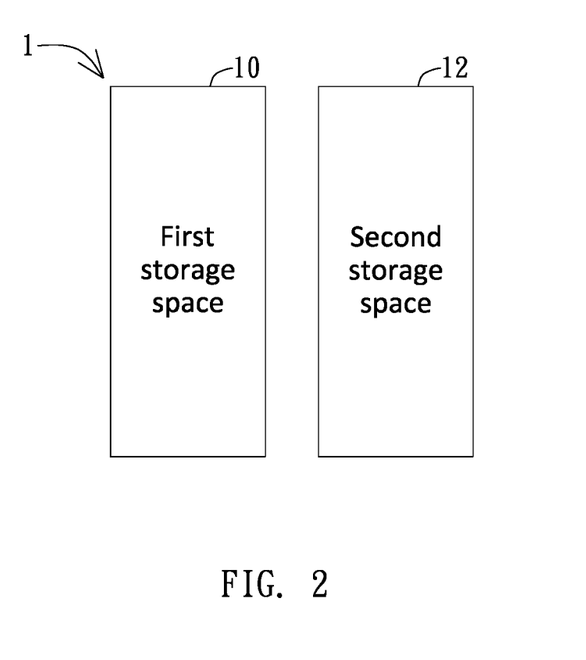
FIG. 2 illustrates a schematic diagram of a reference pixel memory of a conventional high resolution digital image capturing apparatus.

For example, as shown in FIG. 2, a reference pixel memory 1 of a conventional high resolution digital image capturing apparatus includes a first storage space 10 and a second storage space 12. When the high resolution digital image capturing apparatus is calculating a third frame F3, the first storage space 10 and the second storage space 12 are used to store a first frame F1 and a second frame F2 previous to the third frame F3 respectively. However, in practical applications, once the search range window moves from a first region of the first storage space 10 down to a second region, the reference pixels stored in the first region will not be referenced again, therefore, the first region of the first storage space 10 will become a no longer referenced space, and the storage space of the reference pixel memory 1 will be wasted.

Therefore, the invention provides a high resolution digital image capturing apparatus and a reference pixel memory storage space configuration method to solve the above-mentioned problems occurred in the prior arts.

SUMMARY OF THE INVENTION

An embodiment of the invention is a high resolution digital image capturing apparatus. The high resolution digital image capturing apparatus includes a reference pixel memory, a calculation module, and a search module. The storage space of the reference pixel memory includes a main storage sub-space and an extra storage sub-space. The calculation module is used for calculating a first frame to obtain a plurality of first reconstruction reference pixels, and storing the plurality of first reconstruction reference pixels in the main storage sub-space.

The search module is used for moving a search range window to search the plurality of first reconstruction reference pixels. When the search range window is moved from a first region to a second region in the main storage sub-space, the first region becomes an available space. The calculation module calculates a second frame by referencing the plurality of first reconstruction reference pixels covered by the search range window to obtain a plurality of second reconstruction reference pixels, and stores the plurality of second reconstruction reference pixels orderly in the extra storage sub-space and the available space of the main storage sub-space.

In practical applications, the high resolution digital image capturing apparatus can further include a coding/decoding module used for cooperating with the calculation module and the search module to code or decode the first frame and the second frame. And, the coding/decoding module can use the digital video coder/decoder standard H.264/MPEG-4 with high compression ratio to code or decode the first frame and the second frame.

In addition, the high resolution digital image capturing apparatus can also include an image capturing module. In fact, the image capturing module can be a webcam or a computer camera with high resolution used for capturing the first frame and the second frame. The calculation module can use an inter-prediction method to calculate the second frame. In the inter-prediction method, once the search range window leaves the first region, the plurality of first reconstruction reference pixels stored in the first region will not be referenced again, so that the first region will become an available space.

Another embodiment of the invention is a reference pixel memory storage space configuration method. The reference pixel memory storage space configuration method is used to configure a reference pixel memory storage space of a high resolution digital image capturing apparatus. The reference pixel memory storage space includes a main storage sub-space and an extra storage sub-space.

In this embodiment, the reference pixel memory storage space configuration method includes steps of: calculating a first frame to obtain a plurality of first reconstruction reference pixels; storing the plurality of first reconstruction reference pixels in the main storage sub-space; moving a search range window to search the plurality of first reconstruction reference pixels and calculating a second frame by referencing the plurality of first reconstruction reference pixels covered by the search range window to obtain a plurality of second reconstruction reference pixels, wherein when the search range window is moved from a first region to a second region in the main storage sub-space, the first region becomes an available space; storing the plurality of second reconstruction reference pixels orderly in the extra storage sub-space and the available space of the main storage sub-space.

In practical applications, the high resolution digital image capturing apparatus can be a webcam or a computer camera with high resolution, and can use the digital video coder/decoder standard H.264/MPEG-4 with high compression ratio to code or decode the first frame and the second frame. In addition, the size of the extra storage sub-space is not smaller than the size of a half of the search range window and a search macro block row, but the size of the extra storage sub-space is smaller than the size of a frame.

The above-mentioned first frame can be calculated by an inter-prediction method or an intra-prediction method, and the second frame can be calculated by an inter-prediction method. In the inter-prediction method, once the search range window leaves the first region, the plurality of first reconstruction reference pixels stored in the first region will not be referenced again, so that the first region will become an available space.

Compared to prior arts, the high resolution digital image capturing apparatus and the reference pixel memory storage space configuration method of the invention use the calculation characteristic of the inter-prediction method to judge when the pixels of the reference frame will be no longer within in the search range. Once the pixels of the reference frame are not used as reference pixels again, the reference frame can be overwritten by a new frame to reduce the usage of the reference pixel memory storage space to effectively save the memory space.

The advantage and spirit of the invention may be understood by the following detailed descriptions together with the appended drawings.

DETAILED DESCRIPTION OF THE INVENTION

The invention provides a high resolution digital image capturing apparatus and a reference pixel memory storage space configuration method applied in the high resolution digital image capturing apparatus using the calculation characteristic of the inter-prediction method to judge whether the pixels of the reference frame stored in the reference pixel memory are still used as the reference frame for calculation, if not, the reference frame can be overwritten by a following new reference frame to effectively save the memory space.

A first embodiment of the invention is a high resolution digital image capturing apparatus. In this embodiment, the high resolution digital image capturing apparatus can be preferably a webcam or a computer camera with high resolution, and can use the digital video coder/decoder standard H.264/MPEG-4 with high compression ratio to code or decode frames, but not limited to this case.

Figure 3:
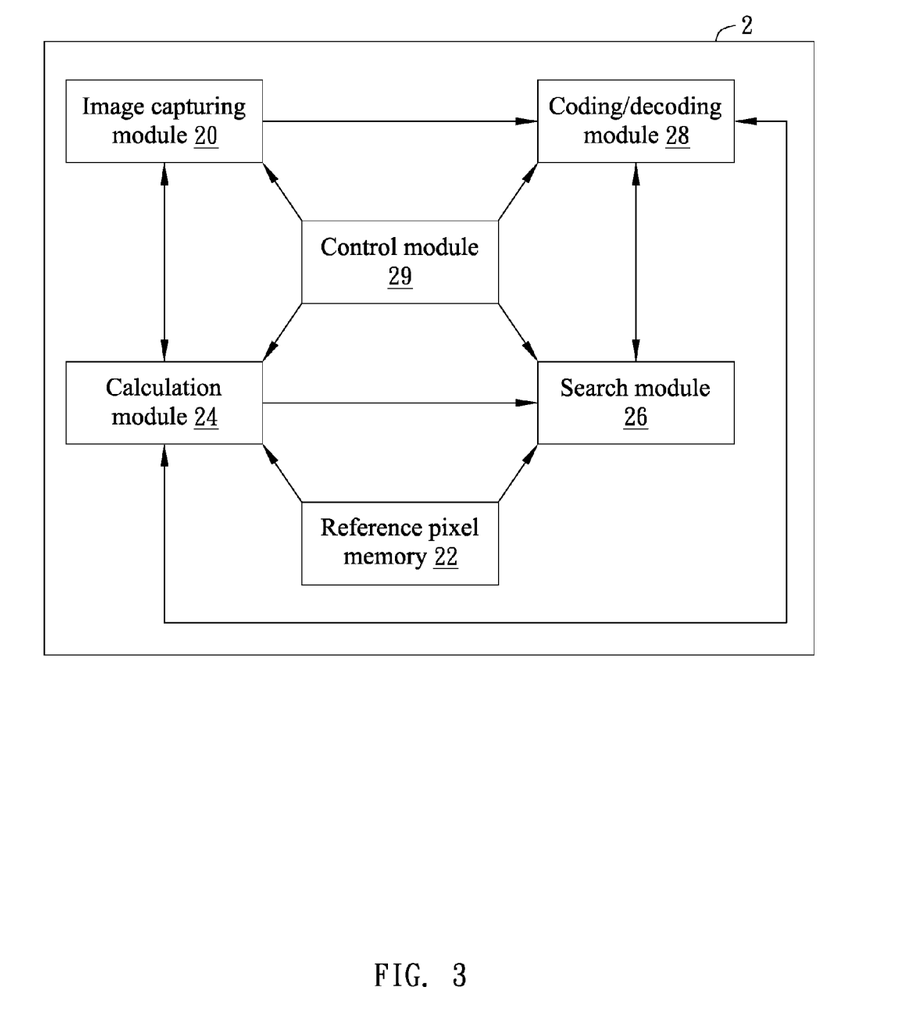
FIG. 3 illustrates a functional block diagram of a high resolution digital image capturing apparatus in an embodiment of the invention.

Please refer to FIG. 3. FIG. 3 illustrates a functional block diagram of the high resolution digital image capturing apparatus in this embodiment of the invention. As shown in FIG. 3, the high resolution digital image capturing apparatus 2 includes an image capturing module 20, a reference pixel memory 22, a calculation module 24, a search module 26, a coding/decoding module 28, and a control module 29. The image capturing module 20 is coupled to the calculation module 24; the calculation module 24 is coupled to the reference pixel memory 22; the search module 26 is coupled to the reference pixel memory 22 and the calculation module 24 respectively; the coding/decoding module 28 is coupled to the image capturing module 20, the calculation module 24, and the search module 26 respectively; the control module 29 is coupled to the image capturing module 20, the calculation module 24, the search module 26, and the coding/decoding module 28 respectively.

Next, the above-mentioned modules of the high resolution digital image capturing apparatus 2 and their functions will be introduced in detail as follows.

In this embodiment, the image capturing module 20 of the high resolution digital image capturing apparatus 2 is used to capture high resolution images from outside. For example, the image capturing module 20 can be any kind of video recorder or camera without specific limitations.

Figure 4A:
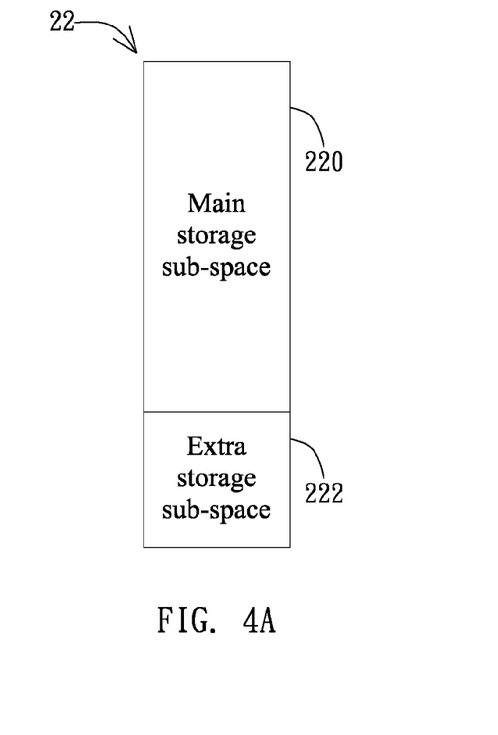
FIGS. 4A and 4B illustrate schematic diagrams of a reference pixel memory.
Figure 4B:
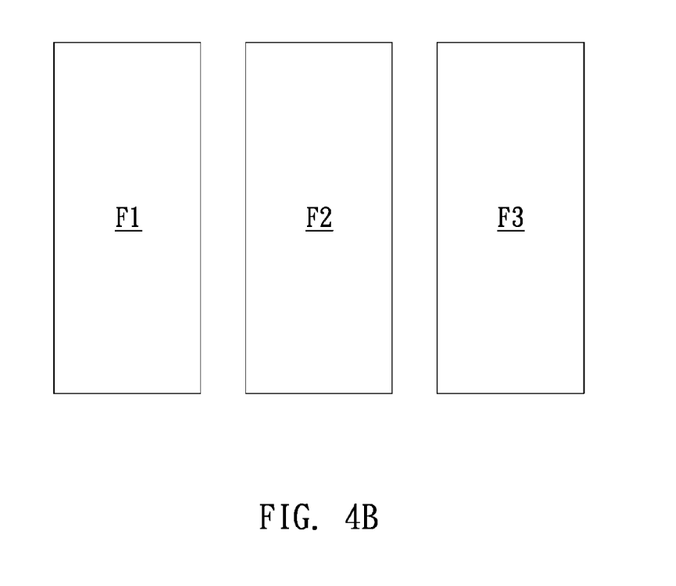

The type of the reference pixel memory 22 also has no specific limitations; it can be a dynamic random access memory (DRAM), a static random access memory (SRAM), a flash memory, or other types of memory. Please refer to FIG. 4A and FIG. 4B. FIG. 4A and FIG. 4B illustrate schematic diagrams of the reference pixel memory 22 in this embodiment. As shown in FIG. 4A and FIG. 4B, the storage space of the reference pixel memory 22 includes a main storage sub-space 220 and an extra storage sub-space 222. As shown in FIG. 4A, the extra storage sub-space 222 is smaller than the main storage sub-space 220. The size of the extra storage sub-space 222 is not smaller than the sum of a half of the search range window and a search macro block row, but the size of the extra storage sub-space 222 is smaller than the size of a frame. It should be noticed that the main storage sub-space 220 and the extra storage sub-space 222 can be connected to each other in a head-to-tail way or separated by a gap (not directly connected to each other).

The calculation module 24 is used for calculating a first frame to obtain a plurality of first reconstruction reference pixels, and storing the plurality of first reconstruction reference pixels in the main storage sub-space 220. In this embodiment, the size of the plurality of first reconstruction reference pixels is not larger than the size of the main storage sub-space 220, but not limited to this case.

The search module 26 is used for moving a search range window to search the plurality of first reconstruction reference pixels. When the search range window is moved from a first region to a second region in the main storage sub-space 220, the first region becomes an available space. The calculation module 24 calculates a second frame by referencing the plurality of first reconstruction reference pixels covered by the search range window to obtain a plurality of second reconstruction reference pixels, and stores the plurality of second reconstruction reference pixels orderly in the extra storage sub-space 222 and the available space of the main storage sub-space 220.

That is to say, since the first region has become the available space that the search range window will no longer cover, it is better to use new reconstruction reference pixels to overwrite the stored old ones than to waste storage space to store these useless reconstruction reference pixels, so that the memory space can be effectively used to reduce the memory space needed in entire digital video compression process.

In this embodiment, the coding/decoding module 28 is used for cooperating with the calculation module 24 and the search module 26 to code or decode the first frame and the second frame captured by the image capturing module 20. In fact, the coding/decoding module 28 can use the digital video coder/decoder standard with high compression ratio (e.g., H.264/MPEG-4) to code or decode the first frame and the second frame, but not limited to this case.

In practical applications, the control module 29 can be a central processing unit (CPU). The control module 29 can be coupled to an electronic apparatus (e.g., a mobile phone or a computer) and control the image capturing module 20, the calculation module 24, the search module 26, and the coding/decoding module 28 to respectively operate their functions according to a control command provided from the electronic apparatus.

Figures 5A, 5B, 5C:
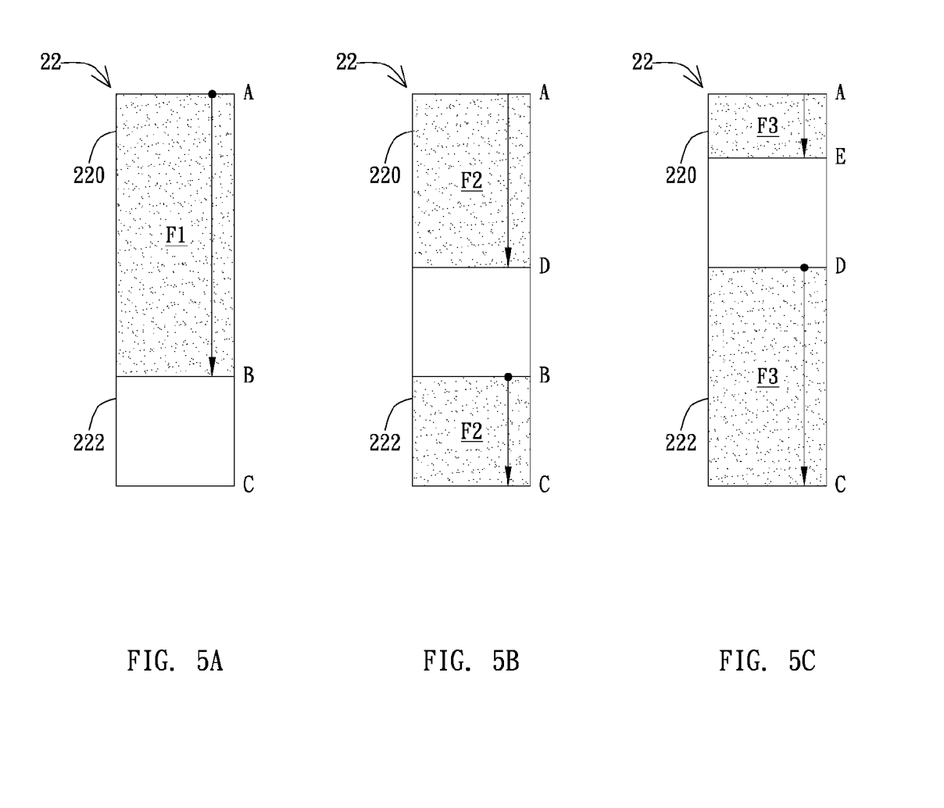
FIGS. 5A, 5B, and 5C illustrate schematic diagrams of storing a first frame, a second frame, and a third frame in the reference pixel memory.

Please refer to FIG. 5A~FIG. 5C. FIG. 5A~FIG. 5C illustrate schematic diagrams of storing a first frame, a second frame, and a third frame in the reference pixel memory. As shown in FIG. 5A, the first frame F1 is stored in the main storage sub-space 220 of the reference pixel memory 22 from the A end of the main storage sub-space 220 to the B end of the main storage sub-space 220 to be a reference frame for the calculation module 24 to calculate the second frame F2. In practical applications, it should be noticed that the size of the first frame F1 is not necessary to be equal to the size of the main storage sub-space 220; the size of the first frame F1 can be also smaller than the size of the main storage sub-space 220. Therefore, it is not limited to this case.

Next, as shown in FIG. 5B, the second frame F2 is stored in the extra storage sub-space 222 of the reference pixel memory 22 starting from the B end of the extra storage sub-space 222. When the second frame F2 has been stored to the C end of the extra storage sub-space 222, there is still a part of the second frame F2 not stored. At this time, since the size of the extra storage sub-space 222 is not smaller than the sum of a half of the search range window and a search macro block row, the A end of the main storage sub-space 220 of the reference pixel memory 22 will start to exclude from the range covered by the search range window for calculating the second frame F2, and the reference pixels of the first frame F1 stored at the A end of the main storage sub-space 220 will be no longer used as the reference pixels for calculating the second frame F2. Therefore, the part of the second frame F2 not stored will be continually stored from the A end of the main storage sub-space 220 to overwrite the reference pixels of the first frame F1 previously stored in the main storage sub-space 220 to the D end in the main storage sub-space 220. That is to say, the second frame F2 will be stored from the B end to the C end, and then continually stored from the A end to the D end, so that the stored second frame F2 can be used as the reference frame for the calculation module 24 to calculate the third frame F3.

Similarly, as shown in FIG. 5C, the third frame F3 is stored in the main storage sub-space 220 and the extra storage sub-space 222 of the reference pixel memory 22 starting from the D end of the main storage sub-space 220. When the third frame F3 has been stored to the C end of the extra storage sub-space 222, there is still a part of the third frame F3 not stored. At this time, since the A end of the main storage sub-space 220 of the reference pixel memory 22 will start to exclude from the range covered by the search range window for calculating the third frame F3, and the reference pixels of the second frame F2 stored at the A end of the main storage sub-space 220 will be no longer used as the reference pixels for calculating the third frame F3. Therefore, the part of the third frame F3 not stored will be continually stored from the A end of the main storage sub-space 220 to cover the reference pixels of the second frame F2 previously stored in the main storage sub-space 220 to the E end in the main storage sub-space 220. That is to say, the third frame F3 will be stored from the D end to the C end, and then continually stored from the A end to the E end, so that the stored third frame F3 can be used as the reference frame for the calculation module 24 to calculate a following fourth frame. Other frames can be calculated and stored in a similar way and will not elaborate here.

It should be mentioned that the high resolution digital image capturing apparatus of the invention is not limited to the above-mentioned embodiments. For example, the high resolution digital image capturing apparatus can also move a partial space (its size is N3) of its main storage sub-space (its size is N1) to the extra storage sub-space, therefore, the size of the main storage sub-space of its memory is (N1−N3) and the size of the extra storage sub-space of its memory is (N1+N3), and this is also covered by this invention.

Another embodiment of the invention is a reference pixel memory storage space configuration method. In this embodiment, the reference pixel memory storage space configuration method is used to configure a reference pixel memory storage space of a high resolution digital image capturing apparatus. In practical applications, the high resolution digital image capturing apparatus can be preferably a webcam, or a computer camera with high resolution, and can use the digital video coder/decoder standard H.264/MPEG-4 with high compression ratio to code or decode frames, but not limited to this case.

Please also refer to FIG. 4. As shown in FIG. 4, the storage space of the reference pixel memory 22 includes a main storage sub-space 220 and an extra storage sub-space 222. As shown in FIG. 4A, the extra storage sub-space 222 is smaller than the main storage sub-space 220. The size of the extra storage sub-space 222 is not smaller than the sum of a half of the search range window and a search macro block row, but the size of the extra storage sub-space 222 is smaller than the size of a frame.

Figure 6:
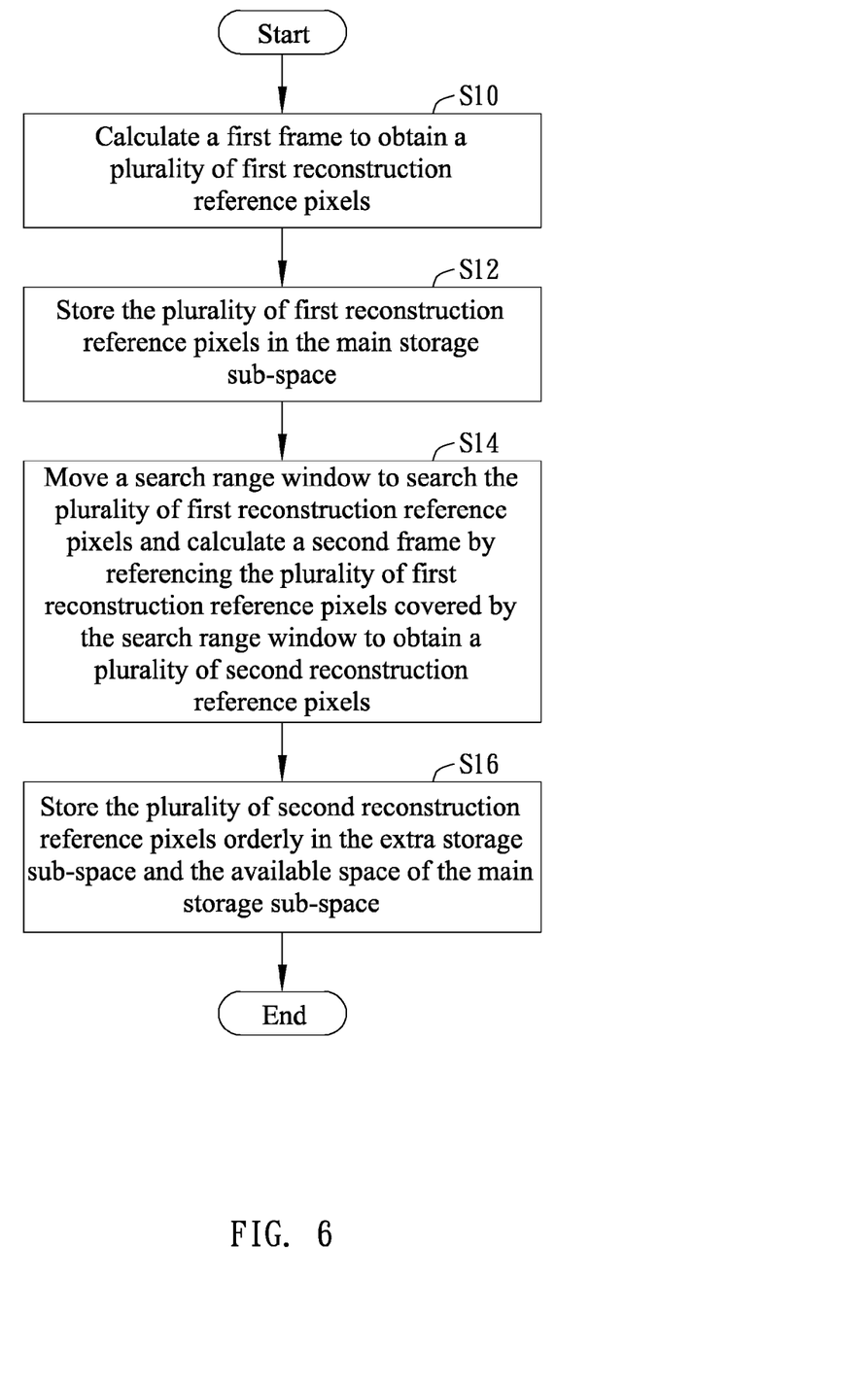
FIG. 6 illustrates a flowchart of the reference pixel memory storage space configuration method in another embodiment of the invention.

Please refer to FIG. 6. FIG. 6 illustrates a flowchart of the reference pixel memory storage space configuration method. As shown in FIG. 6, at first, the method performs the step S10 to calculate a first frame to obtain a plurality of first reconstruction reference pixels. Next, the method performs the step S12 to store the plurality of first reconstruction reference pixels in the main storage sub-space. It should be noticed that the size of the plurality of first reconstruction reference pixels is not larger than the size of the main storage sub-space 220 in this embodiment; that is to say, the main storage sub-space 220 is large enough to store the plurality of first reconstruction reference pixels in this embodiment, but not limited to this case.

Then, the method performs the step S14 to move a search range window to search the plurality of first reconstruction reference pixels and calculate a second frame by referencing the plurality of first reconstruction reference pixels covered by the search range window to obtain a plurality of second reconstruction reference pixels. It should be noticed that when the search range window is moved from a first region to a second region in the main storage sub-space, the first region will become an available space. The above-mentioned second frame is calculated by the inter-prediction method. In the inter-prediction method, once the search range window leaves the first region, the plurality of first reconstruction reference pixels stored in the first region will not be referenced again, so that the first region will become the available space. As to the first frame, it can be calculated by an intra-prediction method, but not limited to this case.

In the prior arts, even the first region has become the no longer used space, and the search range window no longer cover the first region, the first region will still store the previously referenced reference frame, so that the memory space will be wasted.

In order to effectively save the memory space instead of wasting the memory space in the prior arts, the method performs the step S16 to store the plurality of second reconstruction reference pixels orderly in the extra storage sub-space and the available space of the main storage sub-space. That is to say, because the first region has become the available space that the search range window no longer cover, it is better to use new reconstruction reference pixels to overwrite the stored old ones than to waste storage space to store these useless reconstruction reference pixels, so that the memory space can be effectively used to reduce the memory space needed in entire digital video compression process.

Compared to prior arts, the high resolution digital image capturing apparatus and the reference pixel memory storage space configuration method of the invention use the calculation characteristic of the inter-prediction method to judge when the pixels of the reference frame will be no longer within the search range. Once the pixels of the reference frame are no longer used as reference pixels, the reference frame can be overwritten by a new frame to reduce the usage of the reference pixel memory storage space to effectively save the memory space.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A reference pixel memory storage space configuration method, used to configure a reference pixel memory storage space of a high resolution digital image capturing apparatus, the reference pixel memory storage space comprising a main storage sub-space and an extra storage sub-space, the reference pixel memory storage space configuration method comprising steps of:
   (a) calculating a first frame to obtain a plurality of first reconstruction reference pixels;
   (b) storing the plurality of first reconstruction reference pixels in the main storage sub-space;
   (c) moving a search range window to search the plurality of first reconstruction reference pixels and calculating a second frame by referencing the plurality of first reconstruction reference pixels covered by the search range window to obtain a plurality of second reconstruction reference pixels, wherein when the search range window is moved from a first region to a second region in the main storage sub-space, the first region becomes an available space; and
   (d) storing the plurality of second reconstruction reference pixels orderly in the extra storage sub-space and the available space of the main storage sub-space.

2. The reference pixel memory storage space configuration method of claim 1, wherein the high resolution digital image capturing apparatus is a webcam or a computer camera, and the high resolution digital image capturing apparatus uses the digital video coder/decoder standard H.264/MPEG-4 with high compression ratio to code or decode.

3. The reference pixel memory storage space configuration method of claim 1, wherein the size of the extra storage sub-space is not smaller than the sum of a half of the search range window and a search macro block row, but the size of the extra storage sub-space is smaller than the size of a frame.

4. The reference pixel memory storage space configuration method of claim 1, wherein an inter-prediction method is used in step (a) and step (c) to calculate the first frame and the second frame.

5. The reference pixel memory storage space configuration method of claim 4, wherein in the inter-prediction method, once the search range window leaves the first region, the plurality of first reconstruction reference pixels stored in the first region will not be referenced again, so that the first region becomes the available space.

6. The reference pixel memory storage space configuration method of claim 1, further comprising a step of:
   (e) moving the search range window to search the plurality of second reconstruction reference pixels and calculating a third frame by referencing the plurality of second reconstruction reference pixels covered by the search range window to obtain a plurality of third reconstruction reference pixels.

7. A high resolution digital image capturing apparatus, comprising:
   a reference pixel memory, comprising a main storage sub-space and an extra storage sub-space;
   a calculation module, coupled to the reference pixel memory, for calculating a first frame to obtain a plurality of first reconstruction reference pixels, and storing the plurality of first reconstruction reference pixels in the main storage sub-space; and
   a search module, coupled to the calculation module and the reference pixel memory, for moving a search range window to search the plurality of first reconstruction reference pixels, wherein when the search range window is moved from a first region to a second region in the main storage sub-space, the first region becomes an available space;
   wherein the calculation module calculates a second frame by referencing the plurality of first reconstruction reference pixels covered by the search range window to obtain a plurality of second reconstruction reference pixels, and stores the plurality of second reconstruction reference pixels orderly in the extra storage sub-space and the available space of the main storage sub-space.

8. The high resolution digital image capturing apparatus of claim 7, further comprising:
   an image capturing module, coupled to the calculation module, for capturing the first frame and the second frame.

9. The high resolution digital image capturing apparatus of claim 8, wherein the image capturing module is a webcam or a computer camera with high resolution.

10. The high resolution digital image capturing apparatus of claim 8, wherein the image capturing module is a mobile camera with high resolution.

11. The high resolution digital image capturing apparatus of claim 7, wherein the sum of the extra storage sub-space is not smaller than the size of a half of the search range window and a search macro block row.

12. The high resolution digital image capturing apparatus of claim 7, wherein the calculation module uses an inter-prediction method to calculate the second frame.

13. The high resolution digital image capturing apparatus of claim 12, wherein in the inter-prediction method, once the search range window leaves the first region, the plurality of first reconstruction reference pixels stored in the first region will not be referenced again, so that the first region becomes the available space.

14. The high resolution digital image capturing apparatus of claim 7, wherein the search module moves the search range window to search the plurality of second reconstruction reference pixels and the calculation module calculates a third frame by referencing the plurality of second reconstruction reference pixels covered by the search range window to obtain a plurality of third reconstruction reference pixels.

15. The high resolution digital image capturing apparatus of claim 7, further comprising:
a coding/decoding module, coupled to the calculation module, the search module, and the image capturing module, for cooperating with the calculation module and the search module to code or decode the first frame and the second frame.

16. The high resolution digital image capturing apparatus of claim 15, wherein the coding/decoding module uses the digital video coder/decoder standard H.264/MPEG-4 with high compression ratio to code or decode the first frame and the second frame.

17. The high resolution digital image capturing apparatus of claim 7, further comprising:
a control module, coupled to an electronic apparatus, the calculation module, the search module, and the image capturing module, for controlling the calculation module, the search module, and the image capturing module according to a control command of the electronic apparatus.

18. The high resolution digital image capturing apparatus of claim 17, wherein the control module is a central processing unit (CPU).

19. The high resolution digital image capturing apparatus of claim 7, wherein the reference pixel memory is selected from a group consisting of a dynamic random access memory (DRAM), a static random access memory (SRAM), and a flash memory.

* * * * *